United States Patent
Horikawa

(10) Patent No.: US 9,911,547 B2
(45) Date of Patent: Mar. 6, 2018

(54) ELECTRIC STORAGE DEVICE AND METHOD FOR MANUFACTURING THE SAME

(71) Applicant: MURATA MANUFACTURING CO., LTD., Nagaokakyo-Shi, Kyoto-fu (JP)

(72) Inventor: Keiji Horikawa, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 434 days.

(21) Appl. No.: 14/314,138

(22) Filed: Jun. 25, 2014

(65) Prior Publication Data

US 2014/0362496 A1     Dec. 11, 2014

Related U.S. Application Data

(63) Continuation of application No. PCT/JP2012/081473, filed on Dec. 5, 2012.

(30) Foreign Application Priority Data

Dec. 27, 2011   (JP) .................................. 2011-286120

(51) Int. Cl.
*H01G 11/66* (2013.01)
*H01G 11/68* (2013.01)
(Continued)

(52) U.S. Cl.
CPC ............. *H01G 11/68* (2013.01); *H01G 11/10* (2013.01); *H01G 11/52* (2013.01); *H01G 11/66* (2013.01);
(Continued)

(58) Field of Classification Search
CPC ........ H01G 11/28; H01G 11/04; H01G 11/32; H01G 11/42; H01G 11/68; H01G 9/058; H01G 11/66
See application file for complete search history.

(56) References Cited

U.S. PATENT DOCUMENTS 5,850,331 A * 12/1998 Matsumoto ............ H01G 9/155
361/502
7,629,083 B2   12/2009 Cho et al.
(Continued)

FOREIGN PATENT DOCUMENTS

CN         1661829 A        8/2005
JP         02-305426        12/1990
(Continued)

OTHER PUBLICATIONS

PCT/JP2012/081473 ISR dated Jan. 8, 2013.
PCT/JP2012/081473 Written Opnion dated Jan. 8, 2013.

*Primary Examiner* — Nguyen Ha
(74) *Attorney, Agent, or Firm* — Arent Fox LLP

(57) ABSTRACT

An electric storage device having a multilayer body in which a separator layer is provided between a positive or negative first electrode and a second electrode of the opposite polarity to the first electrode, an electrolyte, and a package that holds the multilayer body and the electrolyte, and includes at least two first-polarity compound sheets, each configured by integrating a first-polarity collector electrode, a first-polarity active material layer provided on one main surface of the first-polarity collector electrode, and a separator layer that covers at least part of the one main surface. Another main surface of the first-polarity collector electrode in one of the at least two first-polarity compound sheets and another main surface of the first-polarity collector electrode in another of the first-polarity compound sheets are opposed to each other and joined via a joining layer. The joining layer contains a high-polymer having imide coupling in its main chain.

6 Claims, 9 Drawing Sheets

(51) Int. Cl.
*H01G 11/10* (2013.01)
*H01G 11/72* (2013.01)
*H01M 10/04* (2006.01)
*H01M 10/052* (2010.01)
*H01M 12/00* (2006.01)
*H01G 11/70* (2013.01)
*H01G 11/84* (2013.01)
*H01G 11/52* (2013.01)

(52) U.S. Cl.
CPC .............. *H01G 11/70* (2013.01); *H01G 11/72* (2013.01); *H01G 11/84* (2013.01); *H01M 10/0463* (2013.01); *H01M 10/052* (2013.01); *H01M 12/005* (2013.01); *Y02E 60/13* (2013.01); *Y10T 29/417* (2015.01)

(56) References Cited

U.S. PATENT DOCUMENTS 9,218,917 B2 * 12/2015 Brambilla ........... C01B 31/0233

| | | | |
|---|---|---|---|
| 2001/0056136 A1 * | 12/2001 | Hasegawa | C08K 9/04 523/205 |
| 2004/0233613 A1 * | 11/2004 | Kasahara | H01G 9/155 361/502 |
| 2005/0186479 A1 | 8/2005 | Totsuka et al. | |
| 2012/0171561 A1 * | 7/2012 | Iwasa | H01G 11/32 429/188 |
| 2013/0122347 A1 | 5/2013 | Horikawa et al. | |

FOREIGN PATENT DOCUMENTS

| | | |
|---|---|---|
| JP | 10-163070 | 6/1998 |
| JP | 2004-273181 A | 9/2004 |
| JP | 2005-063978 A | 3/2005 |
| JP | 2005-093859 A | 4/2005 |
| JP | 2005-243303 A | 9/2005 |
| JP | 2010-123988 A | 6/2010 |
| WO | WO-2012-002358 A1 | 1/2012 |

* cited by examiner

ELECTRIC STORAGE DEVICE AND METHOD FOR MANUFACTURING THE SAME

CROSS REFERENCE TO RELATED APPLICATIONS

The present application is a continuation of International application No. PCT/JP2012/081473, filed Dec. 5, 2012, which claims priority to Japanese Patent Application No. 2011-286120, filed Dec. 27, 2011, the entire contents of each of which are incorporated herein by reference.

FIELD OF THE INVENTION

The present invention relates to electric storage devices and methods for manufacturing the electric storage devices.

BACKGROUND OF THE INVENTION

Electric storage devices such as electric double-layer capacitors are widely being used as small, lightweight batteries capable of achieving comparatively high capacities.

Such electric storage devices are manufactured by first forming an electrode by applying a polarizing electrode layer to both surfaces of a collector electrode configured of aluminum foil and then layering the electrodes with separators therebetween, as disclosed in Patent Document 1, for example.

Patent Document 1: Japanese Unexamined Patent Application Publication No. 2010-123988

SUMMARY OF THE INVENTION

However, the conventional technique described above has a problem in that because the electrodes and separators are not integrated by joining the electrodes and the separator to be affixed, the positioning between the electrodes and the separators is unstable, which makes it difficult to achieve a multilayer configuration.

There is a further problem in that thinning the collector electrode to achieve smaller sizes also reduces the strength of the collector electrode, making the collector electrode difficult to handle. For example, it becomes difficult to form an active material layer on both surfaces of the collector electrode.

There is yet a further problem in that when an outside stress acts on the collector electrode, the collector electrode deforms with ease and may break, which leads to a rise in the resistance value, a drop in the capacity, and so on in the electric storage device.

Accordingly, the present invention provides an electric storage device in which multiple layers can be easily configured and that enables easy miniaturization, and provides a method for manufacturing such an electric storage device.

To achieve the aforementioned object, an electric storage device according to the present invention is an electric storage device that has a multilayer body in which a separator layer is provided between a positive or negative first electrode and a second electrode of the opposite polarity to the first electrode, an electrolyte, and a package that holds the multilayer body and the electrolyte, and includes at least two first-polarity compound sheets, each configured by integrating a first-polarity collector electrode, a first-polarity active material layer provided on one main surface of the first-polarity collector electrode, and a separator layer that covers at least part of the one main surface. Here, another main surface of the first-polarity collector electrode in one of the at least two first-polarity compound sheets and another main surface of the first-polarity collector electrode in another of the first-polarity compound sheets are opposed to each other and joined via a joining layer, and the joining layer contains a high-polymer having imide coupling in its main chain.

Further, in the electric storage device according to the present invention, it is preferable that the joining layer contain a high-polymer having siloxane coupling in its main chain.

Further, a method for manufacturing an electric storage device according to the present invention is a method for manufacturing an electric storage device having a multilayer body in which a separator layer is provided between a positive or negative first electrode and a second electrode of the opposite polarity to the first electrode, an electrolyte, and a package that holds the multilayer body and the electrolyte, the method including the steps of preparing a joining resin layer containing a high-polymer having imide coupling in its main chain, disposing a first first-polarity collector electrode such that one main surface thereof opposes one main surface of the joining resin layer, creating a first-polarity compound sheet configured by integrating the first first-polarity collector electrode, a first-polarity active material layer provided on the other main surface of the first first-polarity collector electrode, and a separator layer that covers at least part of the other main surface, and joining the one main surface of the first first-polarity collector electrode to one main surface of a second first-polarity collector electrode via the joining resin layer.

Further, in the method for manufacturing an electric storage device according to the present invention, it is preferable that the joining resin layer contain a high-polymer having siloxane coupling in its main chain.

Further, it is preferable that the method for manufacturing an electric storage device according to the present invention further include forming, on a base material, a layer in which the joining resin layer and the first first-polarity collector electrode are joined, and then removing the base material.

According to the present invention as described thus far, an electric storage device having a high heat resistance, in which multiple layers can be easily configured, and that enables easy miniaturization, and a method for manufacturing such an electric storage device, can be provided.

DETAILED DESCRIPTION OF THE PREFERRED EMBODIMENTS

Hereinafter, an embodiment of the present invention will be described with reference to the drawings.

(1) Electric Storage Device

Figure 8:
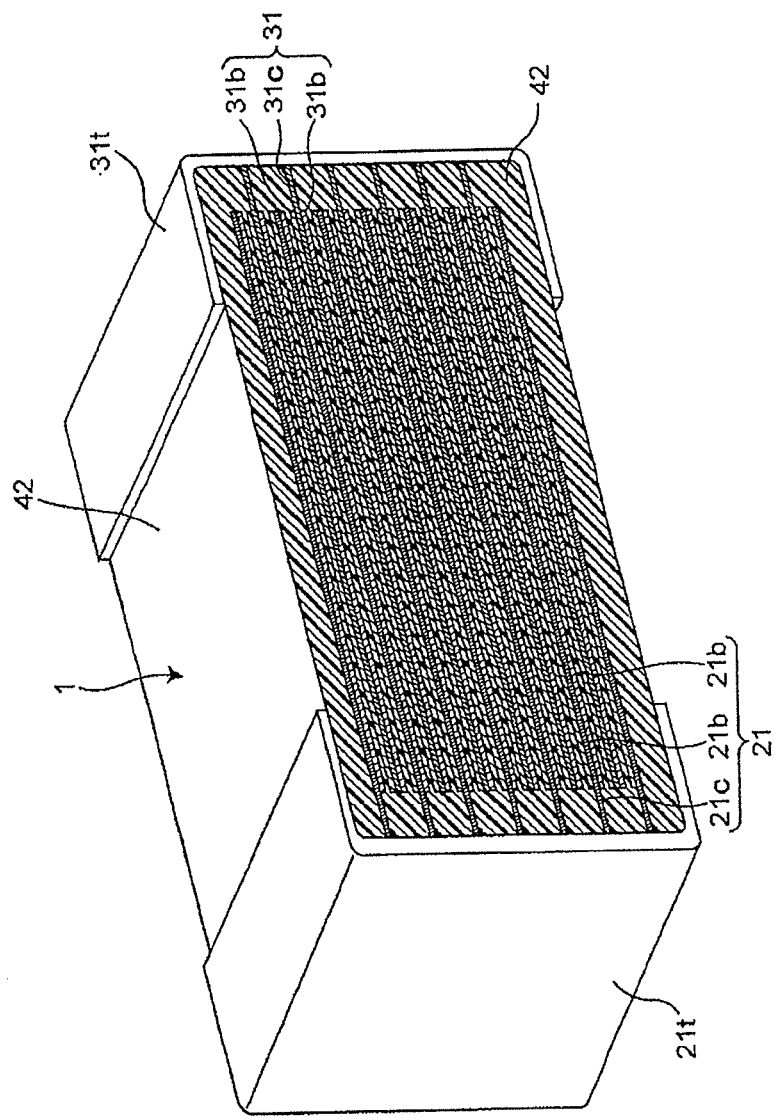
FIG. 8 is a partial cross-sectional perspective view illustrating an electrochemical element in which a positive terminal electrode 21t and a negative terminal electrode 31t are formed in an electrochemical element layered block 1 according to an embodiment of the present invention.

FIG. 8 is a perspective view illustrating an electrochemical element layered block 1 used for an electric storage device according to the present embodiment.

Figure 9:
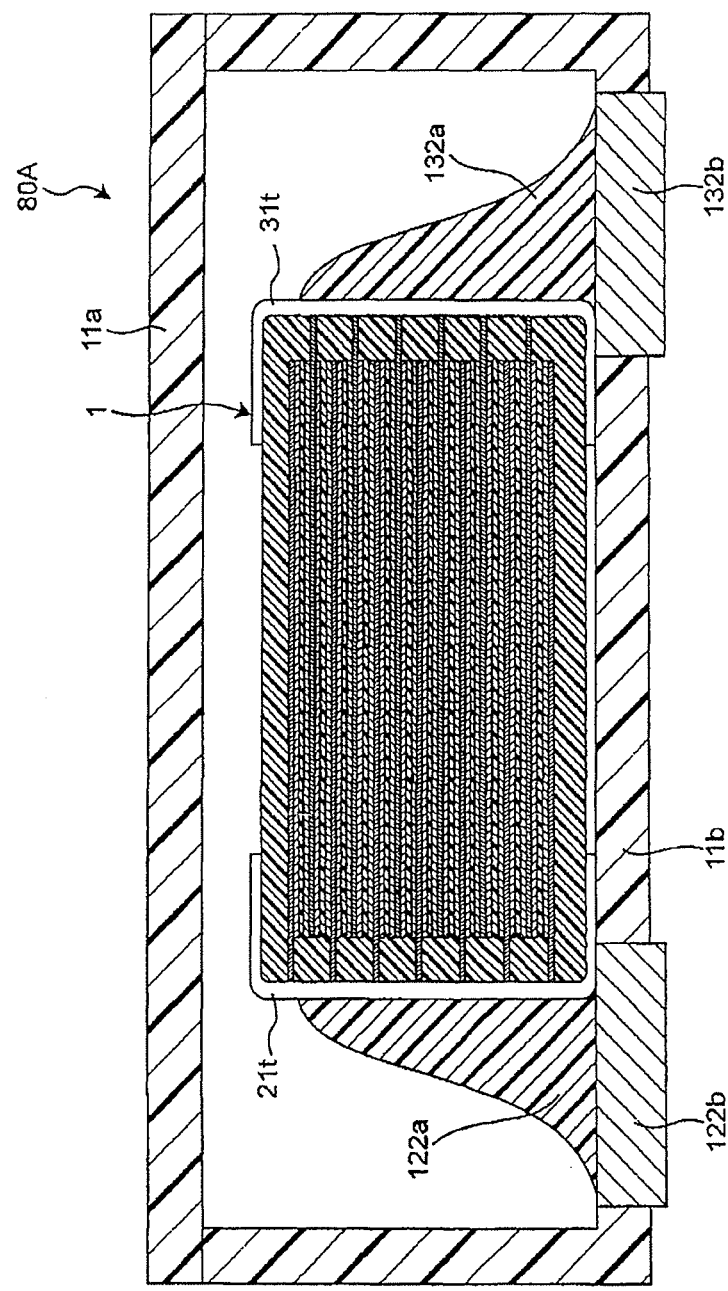
FIG. 9 is a cross-sectional view of an electric double-layer capacitor 80A serving as an example of an electric storage device including the electrochemical element layered block 1 according to an embodiment of the present invention.

FIG. 9 is a cross-sectional view of an electric double-layer capacitor 80A serving as an example of the electric storage device including the electrochemical element layered block 1.

Figure 3:
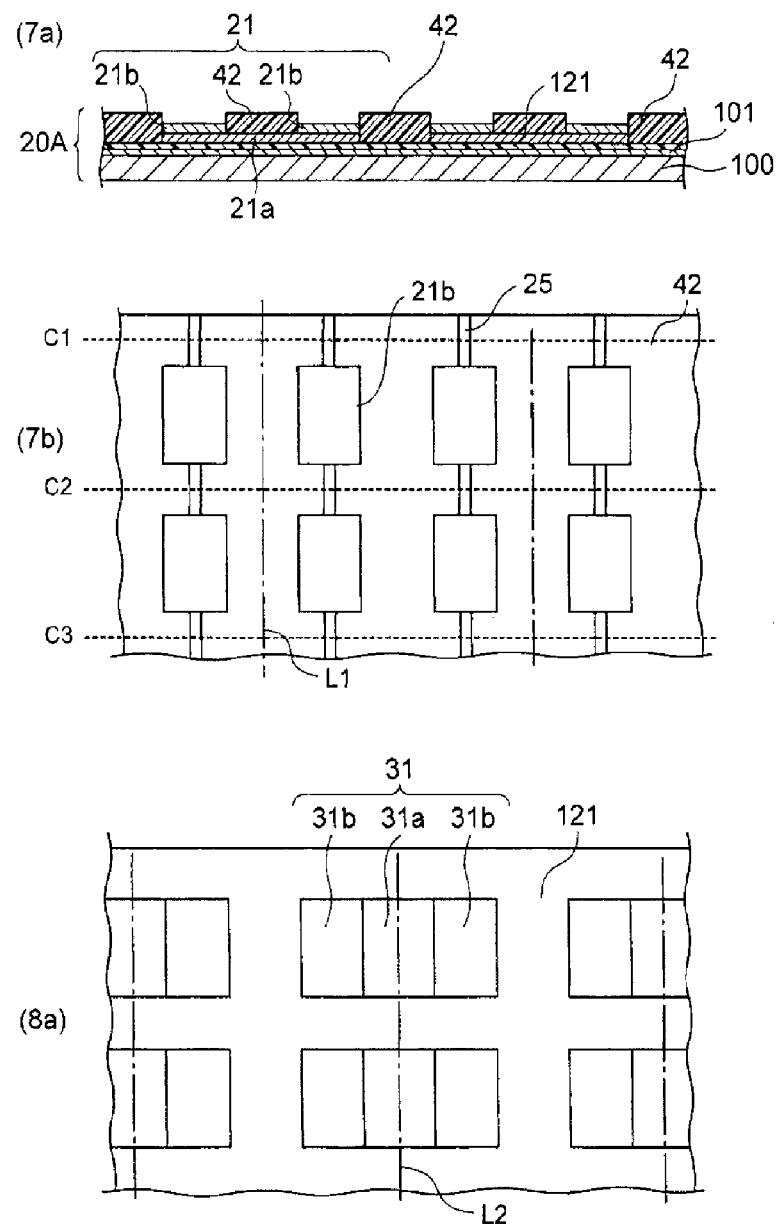
FIG. 3 is a diagram illustrating a process for forming a separator layer 42 on the positive electrode 21 and manufacturing a positive compound sheet 20A and a process for forming a negative collector electrode 31a and a negative active material layer 31b in the method for manufacturing an electric storage device according to an embodiment of the present invention, where (7a) is a cross-sectional view illustrating the separator layer 42 being formed on the positive collector electrode 21a and the joining resin layer 121, (7b) is a plan view of (7a), and (8a) is a plan view illustrating a negative electrode 31 being formed on a base film.

FIG. 8 illustrates a front surface of the electrochemical element layered block 1 (that is, the surface indicated by hatching) as a cross-section so that the overall arrangement of positive electrodes 21 (positive collector layers 21c and positive active material layers 21b) and negative electrodes 31 (negative collector layers 31c and negative active material layers 31b) can be understood; however, it should be noted that in actuality, this surface is covered by an adhesive separator layer 42, which will be described in detail later with reference to a manufacturing method, and an electrolyte is supplied to an electric storage unit within the electrochemical element layered block 1 via cutouts 25 provided in the separator layer 42 (see FIG. 3 (7b)). In other words, the cutouts 25 function as electrolyte conducting channels capable of introducing the electrolyte into the electrochemical element layered block 1.

A rear surface of the electrochemical element layered block 1 (that is, a surface parallel to the front surface) is also covered by the separator layer 42 (not shown), and the cutouts 25 may also be provided in the separator layer 42 that covers the rear surface.

As will be described later, housing the electrochemical element layered block 1 along with the electrolyte within a package having a positive package electrode and a negative package electrode enables an electric storage device, such as an electric double-layer capacitor, a lithium-ion secondary battery, or a lithium-ion capacitor to be formed.

The electrochemical element layered block 1 includes a multilayer body in which a plurality of electric storage units, each having a set of the positive electrode 21 (the positive collector layer 21c and the positive active material layer 21b) and the negative electrode 31 (the negative collector layer 31c and the negative active material layer 31b) in which the positive active material layer 21b and the negative active material layer 31b oppose each other, and the separator layer 42 that is disposed between the positive and negative electrodes and that adheres to part of a surface of the positive electrode and part of a surface of the negative electrode (details are not shown in FIG. 8).

As will be described later, in the present invention, at least one positive collector layer 21c (or at least one negative collector layer 31c) is formed by the main surfaces of two positive collector electrodes (or two negative collector electrodes) being joined to each other via a joining layer containing a high-polymer having imide coupling in the main chain.

Imide coupling has a conjugate structure in which aromatics couple with each other, and thus has a strong molecular structure. Furthermore, because high-polarity imide coupling has a strong intermolecular force, the molecular chain coupling thereof is also strong, and as such, a joining layer that has a high mechanical strength and high heat resistance can be obtained.

Meanwhile, in the present invention, it is preferable for the joining layer to contain a high-polymer having siloxane coupling in its main chain. Coupling between Si—O in such siloxane coupling has a high coupling energy, and is highly heat-resistant. Furthermore, siloxane coupling has a low rotational barrier, and provides flexibility due to the comparative freedom with which the Si—O coupling can be rotated; thus high adhesive properties can be expected therefrom.

The separator layer 42 forms the electrolyte conducting channels, which can conduct the electrolyte into the interior, between the positive active material layers 21b and the negative active material layers 31b.

Accordingly, by disposing the electrochemical element layered block 1 within a package and supplying the electrolyte to the interior of the package, the electrolyte can be supplied (injected) into the electric storage unit with ease.

As a result, problems such as deterioration and vaporization of the electrolyte caused by heat or the like when layering the electric storage unit can be prevented from occurring.

In addition, because the electrolyte can be injected after the multilayer body is formed, it is not necessary to handle the electric storage unit with the electrolyte contained therein when layering the electric storage unit, which is effective because the process is simplified.

Furthermore, the electrolyte reaches the interior of the electric storage unit in a shorter amount of time, and there is thus a further advantage in that the electrolyte can be injected with ease.

Note that this is not intended to limit the injection of the electrolyte into the electrochemical element layered block 1 to being carried out after the electric storage unit has been layered in the manufacture of the electric storage device that employs the electrochemical element layered block 1. The electrolyte may be injected before the electric storage unit is layered and/or during the electric storage unit is being layered, and additional injections may be made after the electric storage unit is layered.

As described above, the separator layer 42 has an adhesive property so that the separator layer 42 can adhere to part of the surface of the positive electrode or part of the surface of the negative electrode, or to another separator layer 42.

A thermoplastic resin (PVDF (polyvinylidene fluoride) or a propylene hexafluoride copolymer thereof, polyethylene oxide, or the like), a thermosetting resin such as polyimide, polyamide-imide, or polyamide, or the like can be used for the separator layer 42.

Of these, thermoplastic resins soften when heated to a glass-transition temperature or a melting point, and thus heating or pressurizing while heating increases the surface area of contact with adhesion targets such as the positive active material layer 21b, the negative active material layer 31b, the positive collector layer 21c or negative collector layer 31c, or another separator layer, resulting in a high adhesive strength (joining strength); as such, using a thermoplastic resin is preferable.

Meanwhile, PVDF, which is a thermoplastic resin, has superior heat resistance and solvent resistance properties.

On the other hand, thermosetting resins are highly heat-resistant, have strong binding force and superior chemical stability, and are stronger than thermoplastic resins, and thus enhance the strength of the multilayer body.

Pressurizing or heating the respective electrodes provided with the separator layers 42 can be given as an example of a method for bonding the separator layers 42 to the stated adhesion targets, and the separator layers 42 become integrated with the adhesion targets (positive electrodes, negative electrodes, or the like) through the pressurization and heating. Stronger adhesion can be achieved by applying heat and pressure at the same time.

When manufacturing the multilayer body by layering the respective electrodes provided with the separator layers 42, when layering the electrodes in sequence in the multilayer body, a provisional multilayer body is first formed by temporary adhesion using heat or the like, after which the final adhesion is carried out by heating the provisional multilayer body or the like.

Doing so makes it possible to sequentially layer the positive and negative electrodes with precise positioning therebetween during the layering.

The final adhesion may be carried out on a layered group in which a plurality of the multilayer bodies have undergone the temporary adhesion, or may be carried out on individual multilayer bodies after a layered group that has undergone the temporary adhesion is broken down into individual units.

The separator layer 42 may include a particulate insulating member. By providing the separator layer 42 with a particulate insulating member, the strength of the separator layer 42 can be increased, which suppresses the separator layer 42 from crushing during the layering and prevents shorting between electrodes.

To ensure a sufficient adhesive strength for the separator layer 42 and maintain a firm shape with the electrochemical element layered block 1, it is preferable for the separator layer 42 to have a gas permeability of no less than 1250 sec/100 cc.

"Gas permeability" is a measure used to express how easily a gas will permeate, and can be measured by a method based on Japan Industrial Standard P 8117, using a digital OKEN type gas permeation tester (Asahi Seiko Co., Ltd. EG01-5-1MR, for example), under conditions of a cylinder pressure of 0.25 MPa, a measurement pressure of 0.05 MPa, and an inner measurement diameter of 30 mm.

When a gas permeability value is high, a gas will not easily permeate, and likewise a liquid such as an electrolyte will not easily permeate as well.

Next, the electric double-layer capacitor 80A that includes the electrochemical element layered block 1 will be described with reference to FIG. 9.

The electrochemical element layered block 1 is disposed within a package configured of a package base portion 11b and a package cover portion 11a. The package base portion 11b and the package cover portion 11a are formed of a heat-resistant resin such as a liquid-crystal polymer.

A positive package electrode 122b and a negative package electrode 132b, which are configured of a metal such as aluminum, are disposed in the package base portion 11b so as to be isolated from each other.

A positive terminal electrode 21t of the electrochemical element layered block 1, which is electrically connected to a plurality of positive collector layers 21c, is electrically connected to the positive package electrode 122b by a conductive adhesive 122a. Likewise, a negative terminal electrode 31t of the electrochemical element layered block 1, which is electrically connected to a plurality of negative collector layers 31c, is electrically connected to the negative package electrode 132b by a conductive adhesive 132a.

The electrolyte is disposed within the package configured of the package base portion 11b and the package cover portion 11a.

In the case where the electrolyte is supplied to the interior of the package after the electrochemical element layered block 1 has been disposed, the electrolyte reaches the interior of the electric storage unit via the cutouts 25, as described above.

In the electric storage device according to the present embodiment as described thus far, the collector layers are integrated with the separator layers, and thus the separator layers reinforce the strength of the collector layers. Accordingly, even in the case where the device is miniaturized by reducing the thickness of the collector layers, the collector layers can be suppressed from deforming under external stress, which in turn makes it possible to suppress breakage in the collector layers, a rise in the resistance value, a drop in the capacity, and so on.

(2) Manufacturing Method

Next, a method for manufacturing the electric storage device (the electrochemical element layered block 1) according to the present embodiment will be described.

Figure 1:
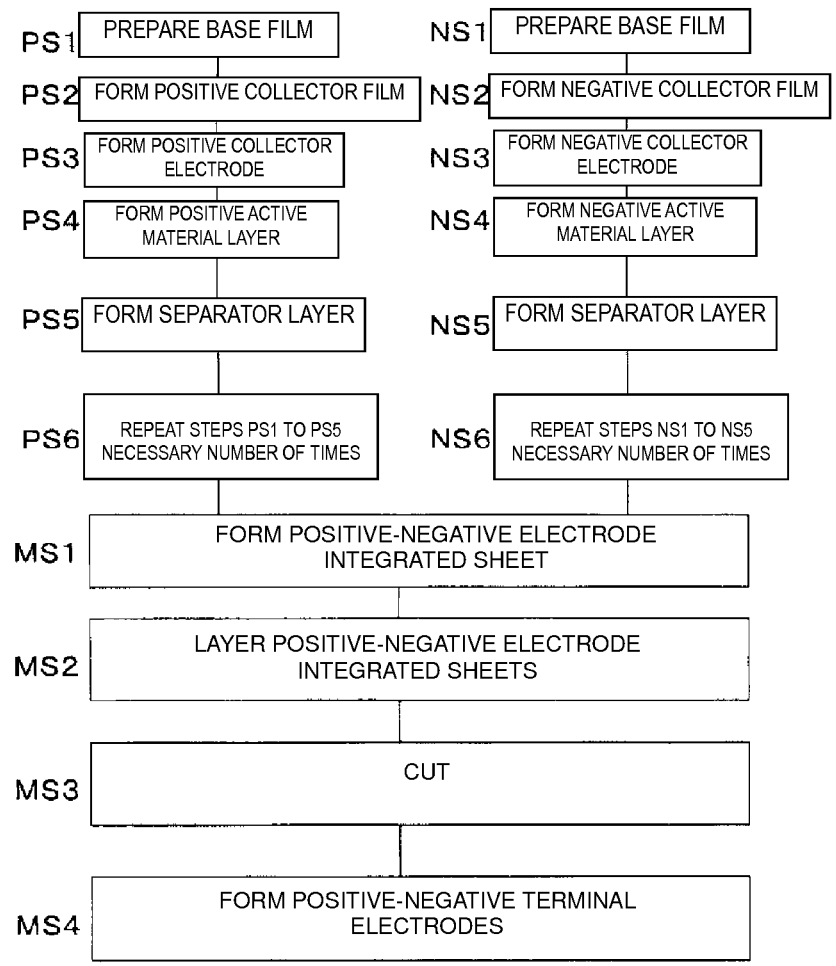
FIG. 1 is a flowchart illustrating a method for manufacturing an electric storage device according to an embodiment of the present invention.

FIG. 1 is a flowchart illustrating steps in the method for manufacturing the electric storage device (the electrochemical element layered block 1) according to the present embodiment. The respective steps will be described hereinafter according to the flow illustrated in FIG. 1.

i) Manufacture of Positive Compound Sheet 20A

Step PS1

Figure 2:
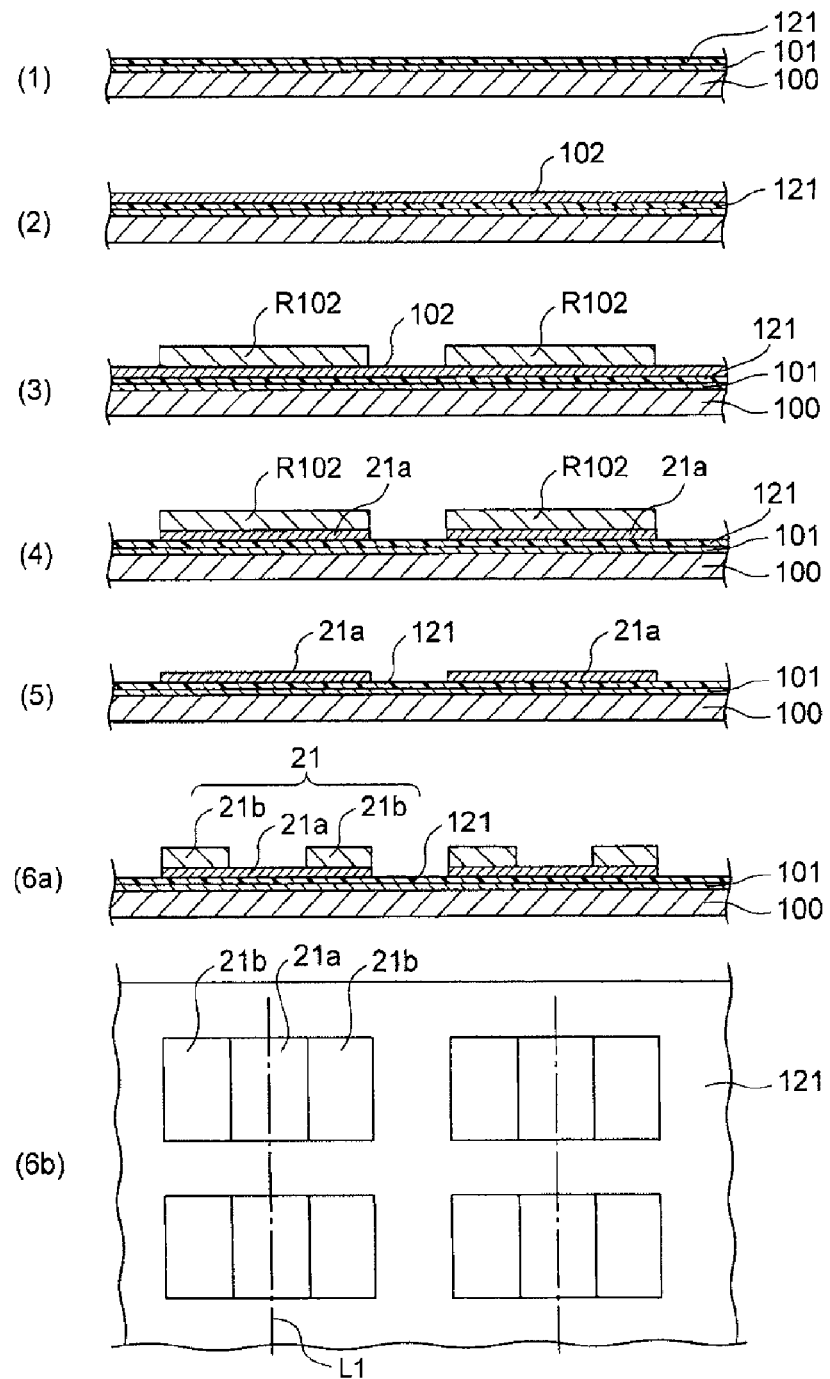
FIG. 2 illustrates a process, in a method for manufacturing an electric storage device according to an embodiment of the present invention, for forming a positive electrode 21 on a base film 100, where (1) is a cross-sectional view of the base film 100 that has a mold releasing layer 101 and a joining resin layer 121, (2) is a cross-sectional view illustrating a positive collector film 102 being formed on the joining resin layer 121, (3) is a cross-sectional view illustrating a resist pattern 8102 being formed on the positive collector film 102, (4) is a cross-sectional view illustrating the positive collector film 102 being etched, (5) is a cross-sectional view illustrating the resist pattern 8102 being removed, (6a) is a cross-sectional view illustrating a positive active material layer 21b being formed on a positive collector electrode 21a, and (6b) is a plan view of (6a).

First, as indicated in FIG. 2 (1), a base film 100, configured of polyethylene naphthalate, for example, and on whose surface is formed a silicone-based mold releasing layer 101, is prepared.

A base film that itself has mold releasing properties can be used without performing a process for imparting mold releasing properties thereon.

It is preferable to use a process for imparting mold releasing properties, such as forming the mold releasing layer 101, for base films that do not have mold releasing properties or to increase the mold releasing properties thereof.

In addition to plastic films such as polyethlene terephthalate, polypropylene, polyester, polycarbonate, polyamide, polyamide-imide, polyethylene, fluorine resin, and cellulose acetate; cellophane, paper, and so on can be used as the base film 100, for example.

Coating a surface of the base film with silicone resin, wax, a surfactant, a metal oxide, fluorine resin, or the like can be given as an example of a process for imparting mold releasing properties.

Aside from these, one or more types of resin such as cellulose nitrate, rigid polyvinyl chloride, polyamide, polyester, melamine resin, urea resin, epoxy resin, urethane resin, and so on can be used as appropriate as the primary component of the mold releasing layer 101. Forming a layer through gravure coating on the base film can then be given as an example of the process for imparting mold releasing properties.

Furthermore, a joining resin layer 121 is formed on the base film 100 (or the mold releasing layer 101). A polyimide-silicone mixed resin, a siloxane-modified polyimide precursor, or the like can be used as the joining resin layer 121, which can then be formed by gravure-coating the base film, on which mold releasing properties have been imparted, with a joining resin layer slurry in which the aforementioned materials have been dissolved in a solvent, and then drying the coat.

Step PS2

Next, as shown in FIG. 2 (2), a positive collector film 102 is formed on the joining resin layer 121 through vapor deposition, for example.

Forming the positive collector film 102 on the joining resin layer 121, whose surface is smooth, in this manner ensures a high level of continuity, and it is easy to obtain a positive collector film 102 that is both a thin film and has a low resistance; as a result, the electric storage device can be effectively made smaller and with a lower profile.

Meanwhile, in addition to vapor deposition, a known technique such as sputtering, coating, or the like can be used to form the positive collector film 102. Vapor deposition and sputtering provide favorable film continuity, and thus make it easy to form a collector film that has a low resistance and is thin. This in turn makes it easy to make the electric storage device smaller and with a lower profile.

Step PS3

As shown in FIG. 2 (3), a plurality of resist patterns 8102 are printed onto the positive collector film 102 at predetermined intervals and dried. The resist patterns R102 are disposed in matrix form, for example, and are formed in the same rectangular shape as the positive collector electrodes 21*a*, which are formed thereafter.

Next, as shown in FIG. 2 (4), the positive collector film 102 is etched using the resist patterns R102 as an etching mask, after which the resist patterns R102 are removed, as shown in FIG. 2 (5). The rectangular positive collector electrodes 21*a* are formed in this manner.

In addition to printing the resist through screen printing, printing the resist through gravure printing, photolithography using a coating-type resist, photolithography using a dry-film resist, or the like may be used as the masking method. Screen printing or gravure printing is preferable if low costs are to be prioritized, whereas photolithography is preferable if precision is to be prioritized.

In addition to a method of etching the collector film, a method of directly vapor-depositing a collector film using a metal mask on the base film on which a mold releasing layer has been formed, a method of carrying out a plasma asking process by directly vapor-depositing a collector film using an oil mask, or the like may be used as the method for forming the collector electrode.

In a case such as where an oxide film is formed on the surface of the positive collector electrodes 21*a*, it is preferable to include a step for removing the oxide film from the positive collector electrodes 21*a* after the positive collector electrodes 21*a* have been formed. In the case where the positive collector electrodes 21*a* are formed of aluminum (Al), for example, the oxide film can be removed from the positive collector electrodes 21*a* by passing the electrodes through a hydrofluoric and sulfuric mixed acid to remove the oxide layer from the surface of the aluminum.

Step PS4

The positive active material layer 21*b* is formed in two locations on the positive collector electrodes 21*a*, as shown in FIG. 2 (6a) and (6b).

The positive active material layer 21*b* can be formed by, for example, screen-printing an active material slurry onto the positive collector electrodes 21*a*, and are formed, for example, symmetrically relative to a centerline L1 that is orthogonal to a lengthwise direction of the positive collector electrodes 21*a*, at predetermined intervals from the centerline L1. It is preferable for the positive active material layer 21*b* to be formed so that side surfaces thereof, aside from inner side surfaces that oppose each other with the centerline L1 therebetween, match outer circumferences of the corresponding positive collector electrodes 21*a*.

Step PS5

Next, as shown in FIG. 3 (7a) and (7b), the separator layer 42 is formed on the joining resin layer 121 and the positive collector electrodes 21*a* so as to surround the positive active material layer 21*b*. At this time, as shown in (7b), the cutouts 25 are provided in the separator layer 42 so as to extend to the positive active material layer 21*b*. The cutouts 25 pass through the separator layer 42, as shown in (7b).

Although not shown in FIG. 8, the front surface of the electrochemical element layered block 1 (the surface indicated by hatching in FIG. 8) is covered by the separator layer 42, as described above. Likewise, the rear surface of the electrochemical element layered block 1 (the surface parallel to the front surface) is covered by the separator layer 42.

The front surface and the rear surface of the electrochemical element layered block 1 can be covered by the separator layer 42 before performing a step MS3, which will be described later, by, for example, cutting off portions that correspond to lines C1 and C2 and a line C3 shown in FIG. 3 (7b) when cutting a plurality of electric storage units arranged in the vertical direction as indicated in FIG. 3 (7b) into individual single units in the vertical direction (one set of a positive electrode (the positive collector electrode 21a and the positive active material layer 21b) and a negative electrode (the negative collector electrode 31a and the negative active material layer 31b) in which the positive active material layer 21b and the negative active material layer 31b oppose each other, along with the separator layer 42 that adheres to part of the positive electrode and part of the negative electrode, will sometimes be referred to as an "electric storage unit"), or when cutting intermediate components for obtaining the electric storage units into individual single components in the vertical direction.

The separator layers 42 that cover the front surface and the rear surface of the electrochemical element layered block 1 each have the cutouts 25. Because the cutouts 25 function as electrolyte conducting channels, the electrolyte can enter the electrochemical element layered block 1 through the cutouts 25.

Meanwhile, by allowing gases produced by the electric storage units in the electrochemical element layered block 1 to pass through the electrolyte conducting channels of the electric storage units, the gases can be exhausted to the exterior of the electric storage unit (the exterior of the electrochemical element layered block 1).

The positive compound sheet 20A is manufactured through the aforementioned steps PS1 to PS5.

Step PS6

In step PS6, steps PS1 to PS5 are repeated until the required number of positive compound sheets 20A are manufactured.

ii) Manufacture of Negative Compound Sheet 30A

As shown in FIG. 1, the negative compound sheets 30A are manufactured through steps NS1 to NS6, which are similar to the steps PS1 to PS6 carried out when producing the positive compound sheets 20A.

Figure 4:
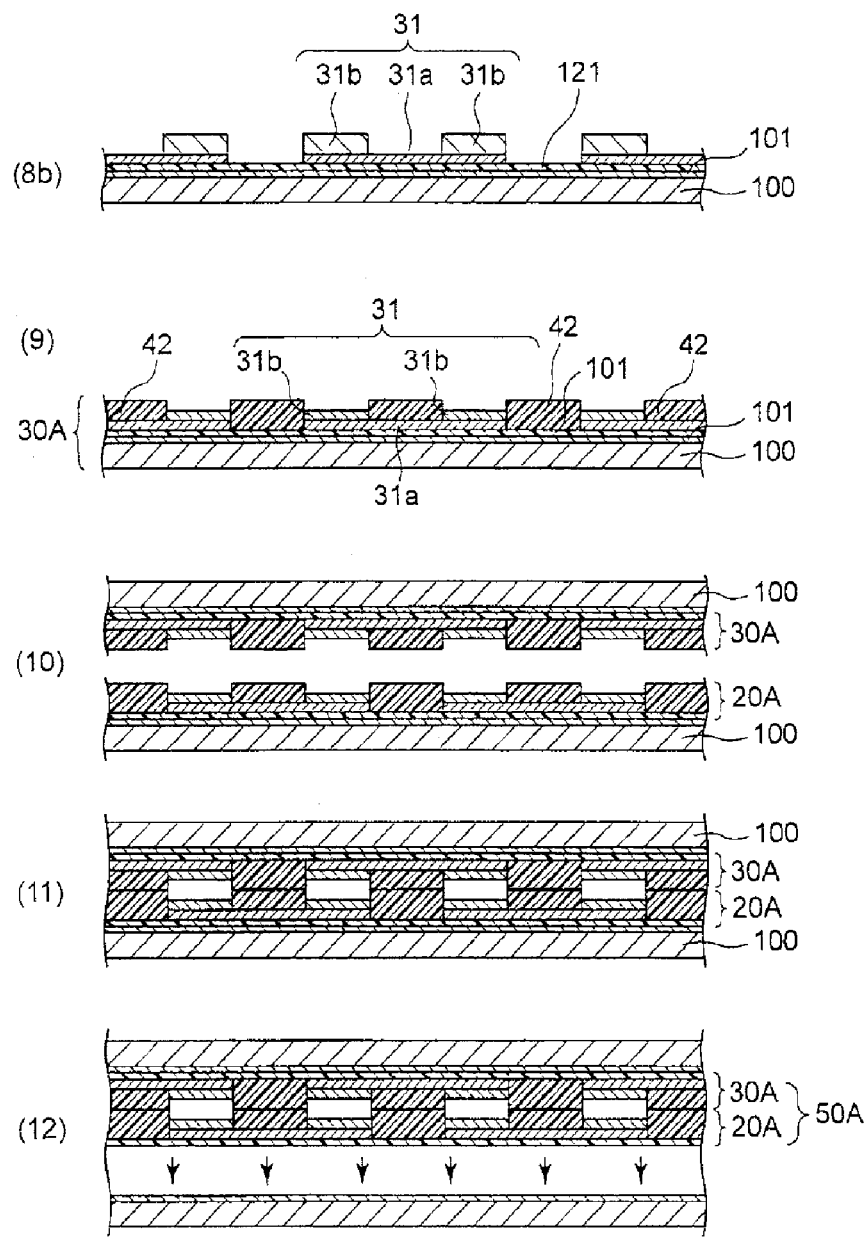
FIG. 4 illustrates a process for forming a positive-negative electrode integrated sheet 50A in the method for manufacturing an electric storage device according to an embodiment of the present invention, where (8b) is a cross-sectional view of (8a) in FIG. 3, (9) is a cross-sectional view of a negative compound sheet 30A, (10) is a cross-sectional view illustrating the positive compound sheet 20A and the negative compound sheet 30A being disposed opposing each other, (11) is a cross-sectional view of the positive-negative electrode integrated sheet 50A in which the positive compound sheet 20A and the negative compound sheet 30A are joined between separator layers 42, and (12) is a cross-sectional view illustrating the base film 100 on the positive side of the positive-negative electrode integrated sheet 50A being removed.

In the negative compound sheet 30A, the negative collector electrode 31a is disposed so that a centerline L2 orthogonal to a lengthwise direction thereof is positioned central to the centerline L1 of the positive collector electrode 21a in the positive compound sheet 20A, as indicated in FIG. 3 (8a) and FIG. 4 (8b), and the negative active material layer 31b formed so as to be symmetrical relative to the centerline L2 and so as to overlap with the positive active material layer 21b.

In steps NS2 to NS4, the negative electrode collector film, the negative collector electrodes 31a, and the negative active material layer 31b are formed in the same manner as the positive collector film 102, the positive collector electrodes 21a, and the positive active material layer 21b in steps PS2 to PS4; however, when manufacturing an electric double-layer capacitor as the electric storage device, the same materials may be used for the positive collector film 102 and the negative collector film, the positive collector electrodes 21a and the negative collector electrodes 31a, and the positive active material layer 21b and the negative active material layer 31b, respectively.

Note that the positive collector electrodes 21a and the negative collector electrodes 31a may have the same shapes and surface areas, or may have different shapes and surface areas. Likewise, the positive active material layer 21b and the negative active material layer 31b may have the same shapes and surface areas, or may have different shapes and surface areas. Taking into consideration positional skew between the positive electrode 21 and the negative electrode 31, the surface area of the positive electrode 21 or the negative electrode 31 may be increased so that the opposing surface areas of the positive electrode 21 and the negative electrode 31 do not change even in the case where the positive electrode 21 and the negative electrode 31 have shifted positions relative to each other; this makes it possible to suppress changes in the resistance, capacity, and so on of the electric double-layer capacitor.

In the present embodiment, when items common between the positive electrode and the negative electrode are described and there is no particular need to distinguish between the two, there are cases where the positive compound sheet 20A and the negative compound sheet 30A are referred to as "compound sheets", the positive collector electrodes 21a and the negative collector electrodes 31a are referred to simply as "collector electrodes", and the positive active material layer 21b and the negative active material layer 31b are referred to simply as "active material layers".

As described in the present embodiment, in the case where an active material layer is applied on the collector electrode, a binder in the active material layer accumulates near the interface between the active material layer and the collector electrode, and thus the binding force between the active material layer and the collector electrode can be increased.

In addition, as described in the present embodiment, applying the active material layer on the thin film collector electrode having a high degree of continuity makes it possible to achieve a smaller size and lower profile.

Meanwhile, although forming the collector electrode on the active material layer makes it difficult to etch the collector electrode and remove an oxidant film on the collector electrode, the active material layer is formed on the collector electrode in the present embodiment; accordingly, the active material layer can be formed after the collector electrode is etched, the oxidant film is removed from the collector electrode, and so on, which makes etching, removing the oxidant film, and so on easy.

iii) Manufacture and Layering of Positive-Negative Electrode Integrated Sheet

Step MS1

First, as shown in FIG. 4 (10), the positive compound sheet 20A and the negative compound sheet 30A are disposed so that the surfaces thereof on which the separator layers 42 are formed oppose each other. Then, as shown in FIG. 4 (11), the separator layers 42 are joined to each other by, for example, pressing the positive compound sheet 20A and the negative compound sheet 30A together at a uniform pressure from both sides thereof using a pressure plate and heating the sheets. The positive-negative electrode integrated sheet 50A is manufactured in this manner.

At this time, for example, the temperature of the pressure plate is set to 80° C., the pressure used in the pressurization is set to 20 MPa, and the pressurizing time is set to 30 seconds.

In the positive-negative electrode integrated sheet 50A manufactured by joining the separator layers 42 to each other in this manner, the positive compound sheet 20A and the negative compound sheet 30A on either side of the joined surfaces have almost equal expansion/contraction characteristics with respect to heat, which suppresses warping after the joining and makes handling easier in the subsequent manufacturing processes.

In addition, because the positive-negative electrode integrated sheet 50A is configured by joining the positive compound sheet 20A and the negative compound sheet 30A to each other, the positive compound sheet 20A and the negative compound sheet 30A will not break even in a case such as where the positive compound sheet 20A and the negative compound sheet 30A have been made thinner. Accordingly, it is even easier to handle the sheets while maintaining a regular arrangement and predetermined positioning, and it is thus possible to further reduce the size and the profile of the device.

A plurality of electric storage units arranged in the horizontal direction are formed in the positive-negative electrode integrated sheet 50A.

Note that as indicated in the present embodiment, it is preferable that, in the positive-negative electrode integrated sheet 50A, a space formed between the positive active material layer 21$b$ and the negative active material layer 31$b$ communicate with the exterior of the positive-negative electrode integrated sheet 50A via the cutouts 25. Accordingly, excess gases (air and the like) can be prevented from being sealed between the positive compound sheet 20A and the negative compound sheet 30A and causing the positive-negative electrode integrated sheet 50A to bulge and deform when manufacturing the positive-negative electrode integrated sheet 50A by joining the positive compound sheet 20A and the negative compound sheet 30A to each other.

After the separator layers have been joined to each other, the base film 100 on the negative compound sheet 30A side or the positive compound sheet 20A is removed.

When removing the base film 100 on the positive side, for example, a suction cup (not shown) is affixed to suck the negative side of the positive-negative electrode integrated sheet 50A, the positive-negative electrode integrated sheet 50A is lifted, and the base film 100 on the positive side is then removed, as shown in FIG. 4 (12).

In the case where the base film 100 on the positive side is to be removed, it is necessary to ensure a higher joining force between the positive compound sheet 20A and the negative compound sheet 30A than the joining force between the base film 100 and the positive compound sheet 20A; a difference between the two joining forces can be realized with comparative ease in the case where a mold releasing layer is present between the base film 100 and the positive compound sheet 20A.

On the other hand, in the case where a mold releasing layer is not present between the base film 100 and the positive compound sheet 20A (that is, between the base film 100 and the joining resin layer 121), the aforementioned difference between the joining forces can be realized by, for example, joining the positive compound sheet 20A and the negative compound sheet 30A to each other at a high temperature and high pressure. However, when joining the sheets at a high temperature and high pressure, it is necessary to exercise caution so that a space between the active material layers, the separator layers, and so on will not collapse, and so that the positive compound sheet 20A, the negative compound sheet 30A, and so on will not deform.

Meanwhile, in the case where the collector electrode has been formed on the joining resin layer 121 through vapor deposition, the strength of adhesion with the base film increases as a result of heat damage to the base film and compressive strain caused by the kinetic energy of the deposited molecules; accordingly, the separation can be difficult if the mold releasing layer is not provided. Accordingly, in the present invention, it is preferable to form the mold releasing layer at a thickness that prevents the base film from being damaged.

When removing the base film 100 on the negative side, a suction cup is affixed to suck the positive side of the positive-negative electrode integrated sheet 50A, the positive-negative electrode integrated sheet 50A is lifted, and the base film 100 on the negative side is then removed.

The required number of positive-negative electrode integrated sheets 50A, in which the base film 100 is joined to either the positive compound sheet 20A side or the negative compound sheet 30A side, are manufactured in this manner.

iv) Layering of Positive-Negative Electrode Integrated Sheet

Step MS2

Figure 5:
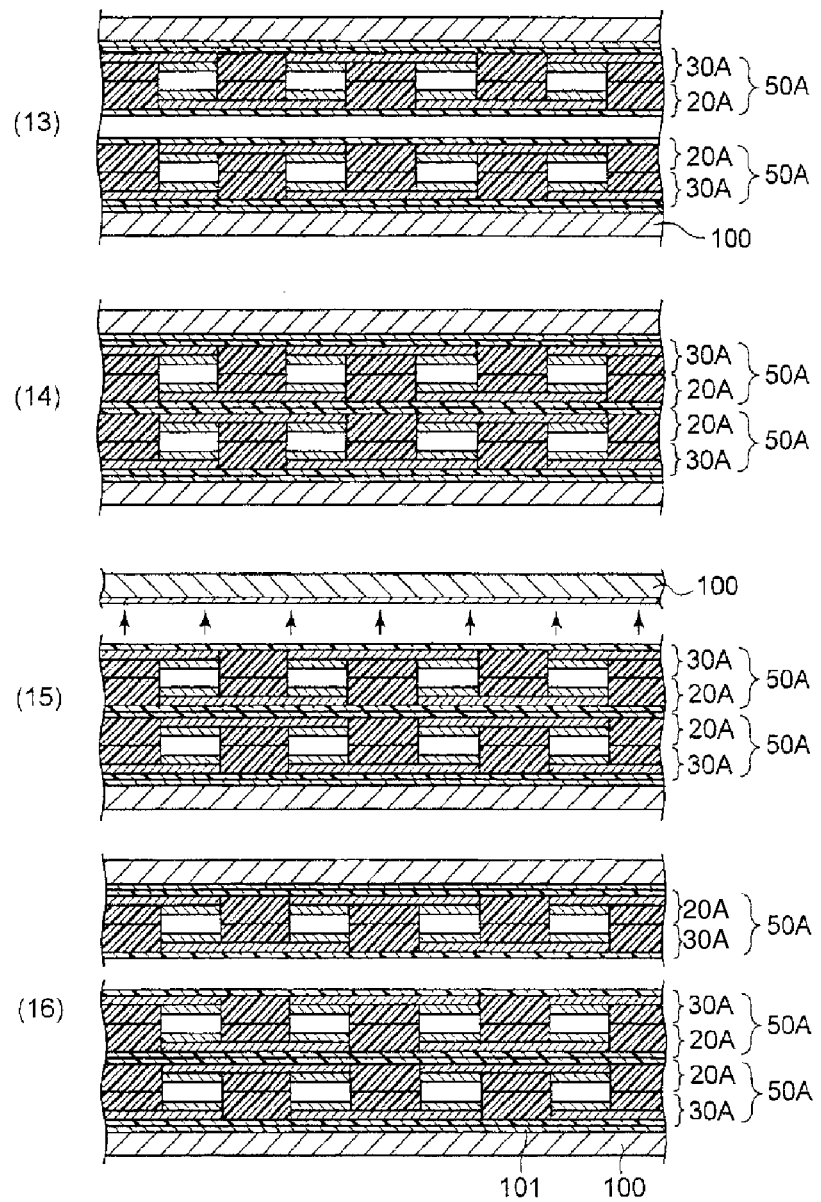
FIG. 5 illustrates a process for layering a positive-negative electrode integrated sheet in the method for manufacturing an electric storage device according to an embodiment of the present invention, where (13) is a cross-sectional view illustrating two positive-negative electrode integrated sheets 50A being disposed opposing each other, (14) is a cross-sectional view illustrating two positive-negative electrode integrated sheets being layered, (15) is a cross-sectional view illustrating one of the base films 100 being removed, and (16) is a cross-sectional view illustrating another positive-negative electrode integrated sheet 50A being disposed on the layered positive-negative electrode integrated sheets 50A.

In a first layer, for example, a positive-negative electrode integrated sheet 50A in which the base film 100 has been joined to the negative compound sheet 30A side is disposed, below a positive-negative electrode integrated sheet 50A to whose negative side a suction cup has been affixed to suck, so that the stated base film 100 is positioned below, as shown in FIG. 5 (13). Then, as shown in FIG. 5 (14), the two positive-negative electrode integrated sheets 50A are brought into contact with each other and joined to each other by applying uniform pressure across the entire surfaces thereof using a pressure plate (not shown).

At this time, for example, the temperature of the pressure plate is set to 200° C., the pressure used in the pressurization is set to 5 MPa, and the pressurizing time is set to 10 seconds.

Note that in the case where the electrochemical element layered block 1 is manufactured with the separator layers disposed at the top and bottom outermost layers as shown in FIG. 8, a separator layer sheet in which only a separator layer having a predetermined thickness (6 μm, for example) is formed upon a base film is used, and in the first instance of layering, the positive-negative electrode integrated sheet 50A is layered upon the separator layer of the separator layer sheet.

Next, the base film 100 on the negative side of the positive-negative electrode integrated sheet 50A to which the suction cup is affixed to suck is removed, as shown in FIG. 5 (15).

Figure 6:
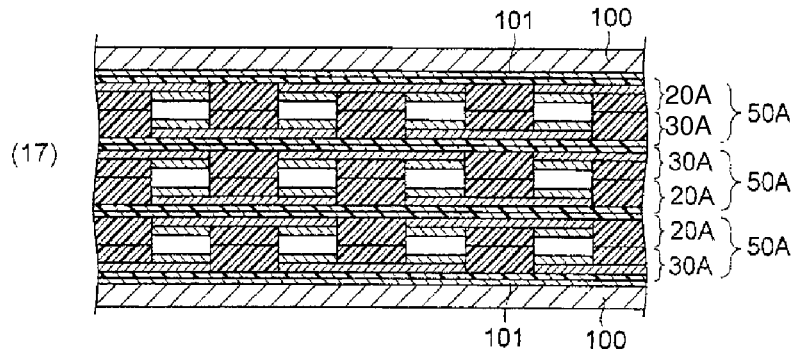
FIG. 6 (17) is a cross-sectional view illustrating yet another positive-negative electrode integrated sheet 50A being layered on the layered positive-negative electrode integrated sheets 50A in the method for manufacturing an electric storage device according to an embodiment of the present invention.

Then, an additional positive-negative electrode integrated sheet 50A from which the negative-side base film 100 has been removed is disposed on the positive-negative electrode integrated sheet 50A whose negative-side base film 100 has been removed so that the negative sides oppose each other, as shown in FIG. 5 (16). The negative sides are then joined to each other, as shown in FIG. 6 (17).

Next, the positive-side base film 100 is removed from the additional positive-negative electrode integrated sheet 50A that has been layered, and a positive-negative electrode integrated sheet 50A whose positive-side base film 100 has been removed is then disposed thereupon so that the positive sides thereof oppose each other. The sheets are then joined to each other by bonding the respective joining resin layers 121 on the positive sides to each other.

Figure 7:
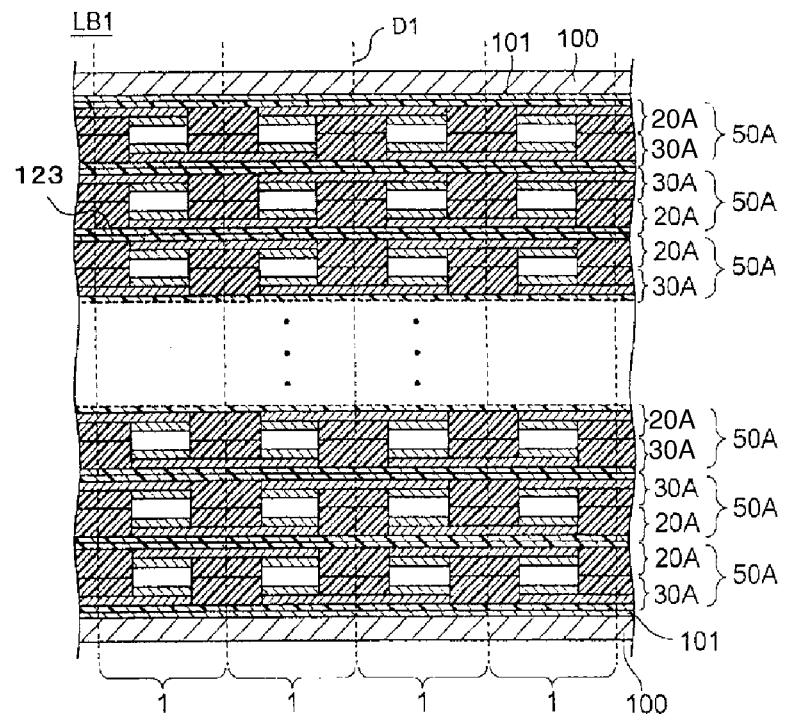
FIG. 7 is a cross-sectional view illustrating an electrochemical element layered sheet LB1 in which the positive-negative electrode integrated sheets 50A are layered, according to an embodiment of the present invention.

Steps MS1 and MS2 are then repeated for the required number of times, and the electrochemical element layered sheet LB1 in which the positive-negative electrode integrated sheets 50A are layered, as shown in FIG. 7, is manufactured.

Note that in the case where the electrochemical element layered block 1 in which separator layers are disposed as the outermost layers, as shown in FIG. 8, is manufactured, the same separator layer sheet in which only a separator layer is formed as that used in the first instance of layering is used, and the separator layer of the separator layer sheet is disposed opposing the first layer and joined in the final instance of the layering.

Then, in the case where the joining resin layer 121 contains a thermosetting resin precursor, a joining layer 123 is obtained by heating the electrochemical element layered sheet LB1 that has been obtained at, for example, 150° C. for 30 minutes and thermally setting the resin. The heating conditions for thermal setting are selected as appropriate based on the components in the thermosetting resin precursor contained in the joining resin layer 121.

It goes without saying that heating for thermal setting is not necessary in the case where the joining resin layer 121 is a thermoplastic resin or the like.

It should be noted that in the electrochemical element layered block 1 manufactured through the aforementioned processes, the positive collector electrodes 21*a* and the negative collector electrodes 31*a* in the outermost layers are each configured of one layer, and are thus thinner than the inner collector electrodes, which are configured by stacking two layers of the positive collector electrodes 21*a* or the negative collector electrodes 31*a*, as shown in FIG. 7. However, in FIG. 8, all of the positive collector layers and negative collector layers are depicted as having the same thickness due to the restrictions of the drawings.

However, in the present invention, the collector electrodes, the active material layers, and so on may have the same thicknesses regardless of where those entities are formed, and it is also possible to change the thicknesses as appropriate in accordance with the formed place, the manufacturing method, and so on.

Step MS3

Next, after the base films 100 disposed on the top and bottom outermost layers of the electrochemical element layered sheet LB1 have been removed, the electrochemical element layered sheet LB1 is cut along cutting lines D1, and the electrochemical element layered blocks 1, each of which is a multilayer body, are manufactured as a result.

In other words, the electrochemical element layered block 1, which is a multilayer body, is manufactured by cutting single layered electric storage units from an entity in which a plurality of electric storage units layered in the vertical direction are arranged in the horizontal direction.

Note that in this step, the base films 100 may be removed after the electrochemical element layered sheet LB1 has been cut.

With the electrochemical element layered block 1, which is a multilayer body, manufactured according to the aforementioned processes, the positive collector layer 21*c* is formed by joining the main surfaces of two of the positive collector electrodes 21*a* to each other with the joining layer 123 interposed therebetween, and the negative collector layer 31*c* is formed by joining the main surfaces of two of the negative collector electrodes 31*a* to each other with the joining layer 123 interposed therebetween.

Step MS4

Then, of the cut surfaces produced by cutting the electrochemical element layered block 1, the positive terminal electrode 21*t* is formed on a cut side surface on which the positive collector layer 21*c* is exposed and the negative terminal electrode 31*t* is formed on a cut side surface on which the negative collector layer 31*c* is exposed, as shown in FIG. 8.

Here, the positive terminal electrode 21*t* and the negative terminal electrode 31*t* can be formed by, for example, sputtering aluminum on the corresponding side surfaces of the electrochemical element layered block 1.

Instead of sputtering, the positive terminal electrode 21*t* and the negative terminal electrode 31*t* may be manufactured by directly forming a conductive film on the side surfaces of the electrochemical element layered block 1 through vapor deposition, ion plating, spray coating, cold spraying, plating, or the like.

The positive terminal electrode 21*t* and the negative terminal electrode 31*t* may be formed by directly applying a conductive adhesive to the side surfaces of the electrochemical element layered block 1 through dipping.

It is preferable for the electrolyte conducting channels not to be exposed on the side surfaces of the electrochemical element layered block 1 on which the positive terminal electrode 21*t* or negative terminal electrode 31*t* are formed. This is because in the case where the electrolyte conducting channels are exposed, the positive terminal electrode 21*t* or the negative terminal electrode 31*t* may enter into the electric storage unit and short with the positive or negative electrodes.

An electric storage device such as the electric double-layer capacitor 80A is manufactured by housing the electrochemical element layered block 1, on whose side surfaces the positive terminal electrode 21*t* and the negative terminal electrode 31*t* have been formed, along with the electrolyte within the package including the positive package electrode 122*b* and the negative package electrode 132*b*, as exemplified in FIG. 9.

When the electrochemical element layered block 1 is housed within the package, the conductive adhesives 122*a* and 132*a*, which contain gold as conductive particles, are applied upon the positive terminal electrode 21*t* and the negative terminal electrode 31*t* through dipping, for example, and the electrochemical element layered block 1 is disposed so that the conductive adhesive 122*a* and the conductive adhesive 132*a* are connected to the positive package electrode 122*b* and the negative package electrode 132*b*, respectively.

The package in which the electrochemical element layered block 1 is disposed is then heated at 170° C. for 10 minutes, for example, which sets the conductive adhesives 122*a* and 132*a* and anchors the electrochemical element layered block 1 to the package electrodes 122*b* and 132*b*, and furthermore electrically connects the positive terminal electrode 21*t* and the negative terminal electrode 31*t* to the positive package electrode 122*b* and the negative package electrode 132*b*, respectively.

Carbon, silver, copper, aluminum, or the like can be used as the conductive particles instead of gold, depending on the application.

Because the electrochemical element layered block 1 housed in the package has the cutouts 25 on the front surface and the rear surface as described above, and because the individual electric storage units have the electrolyte conducting channels, the electrolyte is quickly supplied between the positive active material layer 21*b* and the negative active material layer 31*b* in the electric storage unit.

The method of manufacturing the electrochemical element layered block 1 according to the present embodiment as described thus far includes a step of forming the positive compound sheet 20A or the negative compound sheet 30A on the base film 100 and then removing the positive compound sheet 20A or the negative compound sheet 30A from the base film 100. Accordingly, a plurality of positive collector electrodes 21a patterned on a single, continuous separator layer and the positive active material layer 21b can be formed in an integrated manner.

Likewise, a plurality of negative collector electrodes 31a patterned on a single, continuous separator layer and the negative active material layer 31b can be formed in an integrated manner.

Thus according to the manufacturing method described in the present embodiment, multiple electrochemical element layered blocks 1 can be manufactured at once, which enables greater productivity than a conventional method in which electric double-layer capacitors are handled individually, one at a time.

Furthermore, according to the manufacturing method described in the present embodiment, a plurality of patterned positive collector electrodes 21a or negative collector electrodes 31a are integrated with the single, continuous separator layer 42, and it is thus easy to handle the electrodes. In addition, the positive compound sheet 20A and the negative compound sheet 30A are supported by the base film 100 until the layering is carried out, which makes it even easier to handle the electrodes.

Accordingly, even if the positive collector electrodes 21a or the negative collector electrodes 31a are made thin, for example, those electrodes can still be handled with ease. It is thus possible to manufacture the electrochemical element layered block 1 in a smaller size.

Furthermore, according to the manufacturing method described in the present embodiment, the patterned plurality of positive collector electrodes 21a and/or negative collector electrodes 31a and a plurality of positive active material layers 21b and/or negative active material layers 31b are integrated with the separator layer 42, and thus even if the electrochemical element layered block 1 is miniaturized, the electrochemical element layered block 1 can be handled with ease throughout the manufacturing process, and a smaller electrochemical element layered block 1 can be manufactured.

Furthermore, according to the manufacturing method described in the present embodiment, the adjacent positive electrode 21 and negative electrode 31 are joined and anchored to the separator layer 42, which makes it possible to prevent positional skew between the positive electrode 21 and the negative electrode 31 from occurring during the manufacturing process and after the device has been output as a commercial product.

Accordingly, it is easy to handle the sheets during the manufacturing process and easy to form multiple layers, and a change in characteristics such as the capacity after the device has been output as a commercial product can be suppressed.

In addition, according to the manufacturing method described in the present embodiment, the collector electrodes that have the active material layer formed on one surface thereof are disposed so that the other surfaces oppose each other, which makes it possible to easily realize a state in which active material layers are formed on both surfaces of the collector electrodes; this in turn makes it possible to manufacture the electrochemical element layered block 1 having a high capacity-to-volume ratio.

In other words, forming the active material layer on both sides of collector foil in the conventional manufacturing method is not easy from the standpoint of handling, and thus presents difficulties.

In the present embodiment, the positive-negative electrode integrated sheets 50A are manufactured by joining the positive compound sheet 20A and the negative compound sheet 30A between the separator layers 42, and the electrochemical element layered sheet LB1 is then manufactured by layering the positive-negative electrode integrated sheets 50A. However, it should be noted that the method for manufacturing an electrochemical element layered sheet is not limited to such a method, and the sheet may be manufactured in other ways as well.

For example, the base film 100 is removed from two positive compound sheets 20A and the surfaces from which the base film has been removed are opposed and the positive collector electrodes 21a are joined to each other, creating a positive-positive electrode integrated sheet. Likewise, the base film 100 is removed from two negative compound sheets 30A and the surfaces from which the base film has been removed are opposed and the negative collector electrodes 31a are joined to each other, creating a negative-negative electrode integrated sheet. A layered sheet is then created by disposing the positive-positive electrode integrated sheet and the negative-negative electrode integrated sheet so that the separator layers 42 thereof are opposed to each other and joining the sheets to each other in such a state. Another negative-negative electrode integrated sheet is then disposed so as to oppose the positive-positive electrode integrated sheet side of the stated layered sheet, and the separator layers 42 thereof are then joined to each other. The electrochemical element layered sheet is manufactured by repeating this layering process the necessary number of times.

Note that in the present embodiment, a porous insulating layer having a lower gas permeability than the separator layer 42 may be formed on the positive active material layer 21b and the negative active material layer 31b, and doing so makes it possible to suppress leaking current with more certainty.

First Example

In a first example, the electric double-layer capacitor was manufactured according to the manufacturing method described in the aforementioned embodiment. Note that an electrostatic capacity value was set to 480 mF by design.

Creation of Samples

Sample No. 1

First, a base PEN film on which a silicone-based mold releasing layer 101 was formed was prepared as the base film 100. A joining layer slurry, produced by dissolving a siloxane-modified polyimide precursor (30 wt %) in methyl proxitol acetate (70 wt %), was gravure-printed onto this surface and then dried for 30 seconds at 100° C., forming the joining resin layer 121 at a thickness of 2 μm.

Next, a 500 nm-thick Al film was formed on the surface of the joining resin layer 121 through vacuum deposition as the positive collector film 102. The deposition conditions for the aluminum film were a degree of vacuum of $3\times10^{-4}$ Pa, a current value of 800 mA, a deposition rate of 30 Å/sec, and a base cooling temperature of −10° C.

Then, the resist patterns R102 were printed on the base PEN film 100, on which the aluminum film 102 was formed, through screen printing, with a 20 mm×10 mm rectangular pattern being arranged in five vertical rows and ten horizontal columns and a distance of 8 mm between adjacent patterns, and were then dried at 100° C. for 15 minutes in a hot-blast furnace.

The base PEN film 100 on which the resist patterns R102 were printed was then immersed for 30 seconds in a 45° C. ferric chloride aqueous solution tank, thus wet-etching away the aluminum film aside from the areas masked by the resist, and forming positive collector aluminum electrodes as the positive collector electrodes 21a. The ferric chloride aqueous solution remaining on the base surface was then removed by a rinsing shower.

Although a low-cost ferric chloride was used in Sample No. 1, hydrochloric acid, sulfuric acid, nitric acid, or a mixture thereof can also be used, and a hydrofluoride-based neutral aqueous solution can be used as well.

The base PEN film 100 on which the positive collector electrodes 21a was formed was passed through a butyl acetate shower, removing the resist. Then, the butyl acetate remaining on the base surface was vaporized in a 60° C. hot-blast furnace.

In addition to butyl acetate, propylene glycol monomethyl ether acetate, 3-methoxy butyl acetate, an organic solvent such as an amine-based solvent, or the like can also be used to remove the resist.

Next, an activated charcoal paste was produced by weighing 29.0 g of activated charcoal (BET specific surface area of 1668 $m^2/g$, average pore diameter of 1.83 nm, average particle diameter D50=1.26 μm), 2.7 g of carbon black (TOKABLACK™ No. 3855 by Tokai Carbon Co., Ltd., BET specific surface area of 90 $m^2/g$), 3.0 g of carboxymethyl cellulose (CMC2260 by Daicel Corporation), and 2.0 g of a polyacrylate resin aqueous solution at 38.8 wt %, and mixing these components into 286 g of deionized water.

Next, the positive active material layer 21b was formed at a thickness of 4 μm by screen-printing the produced activated charcoal paste onto the rectangular positive collector electrodes 21a, whose individual sizes were 20 mm×10 mm, forming two active material layer patterns in 6 mm×10 mm rectangular shapes in the arrangement shown in FIG. 2 (6a), and then drying the paste for 20 minutes at 80° C. in a hot-blast furnace.

Next, 160 g of PVDF-HFP (polyvinylidene fluoridepropylene hexafluoride copolymer) and 640 g of NMP (1-methyl-2-pyrrolidone) solvent were mixed, producing a binder solution having 20 mass % PVDF-HFP in the NMP.

Then, the separator layer slurry was obtained by dispersing 25 g of alumina particles (D50=0.3 μm) in 25 g of the NMP and then adding 236 g of the aforementioned binder solution and mixing the resultant.

Using this separator layer slurry, 50 of the positive compound sheets 20A indicated in FIG. 3 (7a) and (7b) were produced. The thickness of the separator layer 42 that was formed (that is, a distance from the surface of the joining resin layer 121 to the surface of the separator layer 42) was 15 μm.

50 of the negative compound sheets 30A were produced and prepared in the same manner.

Next, the positive compound sheet 20A and the negative compound sheet 30A were disposed so that the separator layers 42 opposed each other, with the positive compound sheet 20A being below, and were pressurized and joined to each other from both sides using a uniform pressure across the entire surface. At this time, the temperature of the pressure plate was set to 80° C., the pressure used in the pressurization was set to 20 MPa, and the pressurizing time was set to 30 seconds.

49 more positive-negative electrode integrated sheets were produced in this manner and used as the positive-negative electrode integrated sheets 50A.

The positive-negative electrode integrated sheets 50A were then layered as described below while removing the base PEN film 100 as appropriate.

First, a suction cup was affixed to suck the negative side of a single positive-negative electrode integrated sheet 50A, the positive-negative electrode integrated sheet 50A was lifted, and the base PEN film 100 on the positive electrode side thereof was removed.

Then, a sheet in which an 8 μm-thick separator layer 42 was formed upon a base PEN film 100 was disposed, with the base PEN film 100 being below, below the positive-negative electrode integrated sheet 50A to which the suction cup was affixed to suck and whose positive-side base PEN film 100 was removed, and joined to that positive-negative electrode integrated sheet 50A. At this time, the temperature of the pressure plate was set to 80° C., the pressure used in the pressurization was set to 20 MPa, and the pressurizing time was set to 30 seconds.

Then, the base PEN film 100 on the negative side of the positive-negative electrode integrated sheet 50A to which the suction cup was affixed to suck was removed.

Next, a suction cup was affixed to suck the positive side of an additional single positive-negative electrode integrated sheet 50A, the positive-negative electrode integrated sheet 50A was lifted, and the base PEN film 100 on the negative side thereof was removed.

Then, a positive-negative electrode integrated sheet 50A, to which was joined a sheet in which only the separator layer 42 was formed upon the base PEN film 100, was disposed below the additional positive-negative electrode integrated sheet 50A from whose negative side the base PEN film 100 was removed, and the two positive-negative electrode integrated sheets were joined together by bonding the respective joining resin layers 121 to each other. At this time, the temperature of the pressure plate was set to 200° C., the pressure used in the pressurization was set to 5 MPa, and the pressurizing time was set to 10 seconds.

After the stated joining, the base PEN film 100 on the positive side of the stated additional positive-negative electrode integrated sheet 50A was removed.

Then, a suction cup was affixed to suck the negative side of yet another additional positive-negative electrode integrated sheet 50A from whose positive side the base PEN film 100 was removed, which was then disposed above the above-stated additional positive-negative electrode integrated sheet 50A from whose positive side the base PEN film 100 was removed and joined thereto in the same manner. At this time, the temperature of the pressure plate was set to 200° C., the pressure used in the pressurization was set to 5 MPa, and the pressurizing time was set to 10 seconds.

50 of the positive-negative electrode integrated sheets 50A were layered upon the sheet in which only the separator layer 42 was formed on the base PEN film 100 by repeating the processes described thus far, and the base PEN film 100 was then removed from the uppermost layer thereof.

Finally, a suction cup was affixed to suck the base PEN film 100-side of a separately prepared sheet in which only the separator layer 42 was formed on the base PEN film 100, and that separator layer 42 was joined to the uppermost positive-negative electrode integrated sheet 50A from which the base PEN film 100 was removed, producing the electrochemical element layered sheet as a result. At this time, the temperature of the pressure plate was set to 80° C., the pressure used in the pressurization was set to 20 MPa, and the pressurizing time was set to 30 seconds.

The aforementioned joinings were carried out by making the separator layer 42 be in contact with the positive-negative electrode integrated sheet 50A on the base PEN film 100 or making two positive-negative electrode integrated sheets 50A be in contact with each other, and applying uniform pressure across the entire contact surface using the pressure plate. When joining the separator layer 42 and the positive-negative electrode integrated sheet 50A to each other, the temperature of the pressure plate was set to 80° C., the pressure used in the pressurization was set to 20 MPa, and the pressurizing time was set to 30 seconds. When joining the two positive-negative electrode integrated sheets 50A to each other, the temperature of the pressure plate was set to 200° C., the pressure used in the pressurization was set to 5 MPa, and the pressurizing time was set to 10 seconds.

The precursor within the joining resin layer 121 was polymerized and thermally set by heating the electrochemical element layered sheet LB1 produced as described above for 30 minutes at 150° C., resulting in the siloxane-modified polyimide joining layer 123.

The base PEN films 100 adhering to the top and bottom of the electrochemical element layered sheet LB1 produced as described above were then removed, the electrochemical element layered sheet LB1 was cut, and the electric double-layer capacitor block (electrochemical element layered block) 1 was produced as a result.

Then, the positive terminal electrode 21t and the negative terminal electrode 31t were formed by sputtering aluminum on the side surfaces of the cut electric double-layer capacitor block 1.

This was then housed within the liquid-crystal polymer package configured of the package cover portion 11a and the package base portion 11b including the positive package electrode 122b and the negative package electrode 132b, as shown in FIG. 9. When housing the block in the package, the conductive adhesive 122a and the conductive adhesive 132a, which contain gold as conductive particles, were applied to the positive terminal electrode 21t and the negative terminal electrode 31t, respectively, through dipping, and the electrochemical element layered block 1 was then disposed so that the conductive adhesive 122a and the conductive adhesive 132a were connected to the positive package electrode 122b and the negative package electrode 132b, respectively.

This was heated for 10 minutes at 170° C., the conductive adhesive was set, and the electric double-layer capacitor block 1 was anchored to the package electrodes; furthermore, the terminal electrodes were electrically connected to the package electrodes.

After the stated anchoring to the package and electrical connections were completed as described above, 90 μL of 1-ethyl-3-methyl imidazolium tetrafluoroborate was injected as the electrolyte, and the package was sealed through laser welding.

The Sample No. 1 electric double-layer capacitor was obtained as a result.

Meanwhile, a sample for measuring the breaking strength of the joining resin layer was produced as described hereinafter.

First, the joining resin layer 121 was formed at a thickness of 2 μm through printing and drying on the base film, in the same manner as in the aforementioned method for producing the Sample No. 1 electric double-layer capacitor.

The joining resin layer 121 was then removed from the base film and cut into 5 mm×10 mm rectangles to obtain the sample for measuring the breaking strength of Sample No. 1.

Meanwhile, a sample for measuring the thermal decomposition starting temperature of the joining resin layer was produced as described hereinafter.

First, the joining resin layer 121 was formed at a thickness of 2 μm through printing and drying on the base film, in the same manner as in the aforementioned method for producing the Sample No. 1 electric double-layer capacitor.

The joining resin layer 121 was then removed from the base film and heated for 30 minutes at 150° C., polymerizing and thermally setting the precursor within the joining resin layer 121 and producing siloxane-modified polyimide; this was then taken as the sample for measuring the thermal decomposition starting temperature of Sample No. 1.

Sample No. 2

Aside from using a mixed resin of polyimide and silicone as the joining layer, an electric double-layer capacitor, a sample for measuring the breaking strength, and a sample for measuring the thermal decomposition starting temperature of Sample No. 2 were obtained in the same manner as with Sample No. 1.

Sample No. 3

Aside from using polyimide as the joining layer, an electric double-layer capacitor, a sample for measuring the breaking strength, and a sample for measuring the thermal decomposition starting temperature of Sample No. 3 were obtained in the same manner as with Sample No. 1.

Sample No. 4

Aside from using polyamide-imide as the joining layer, an electric double-layer capacitor, a sample for measuring the breaking strength, and a sample for measuring the thermal decomposition starting temperature of Sample No. 4 were obtained in the same manner as with Sample No. 1.

Sample No. 5

Aside from using silicone as the joining layer, an electric double-layer capacitor, a sample for measuring the breaking strength, and a sample for measuring the thermal decomposition starting temperature of Sample No. 5 were obtained in the same manner as with Sample No. 1.

Sample No. 6

Aside from using a urethane resin as the joining layer, an electric double-layer capacitor, a sample for measuring the breaking strength, and a sample for measuring the thermal decomposition starting temperature of Sample No. 6 were obtained in the same manner as with Sample No. 1.

Sample No. 7

Aside from using an epoxy resin as the joining layer, an electric double-layer capacitor, a sample for measuring the breaking strength, and a sample for measuring the thermal decomposition starting temperature of Sample No. 7 were obtained in the same manner as with Sample No. 1.

Sample No. 8

Aside from using polyacrylate as the joining layer, an electric double-layer capacitor, a sample for measuring the breaking strength, and a sample for measuring the thermal decomposition starting temperature of Sample No. 8 were obtained in the same manner as with Sample No. 1.

Sample No. 9

Aside from using carboxymethyl cellulose as the joining layer, an electric double-layer capacitor, a sample for measuring the breaking strength, and a sample for measuring the thermal decomposition starting temperature of Sample No. 9 were obtained in the same manner as with Sample No. 1.

Note that in Samples No. 2 to 9, the solvent for the joining layer slurry and so on were selected as appropriate in accordance with the components of the joining layer.

Furthermore, in Samples No. 2 to 7, in which the joining layer is a thermosetting resin, the heating temperature, heating time, and so on for thermally setting the resin were selected as appropriate in accordance with the components in the joining layer.

Evaluation of Samples

Using the electric double-layer capacitors of Samples No. 1 to 9 produced as described above as measurement samples, 100 electrostatic capacities were measured for each sample number. Measurement samples whose measured electrostatic capacity values were within ±20% in variation with respect to the design value of 480 mF were determined to be passing, and the electrostatic capacity passing rate was then found. In other words, a measurement sample whose measured electrostatic capacity value was 384 mF to 576 mF was determined to be passing. Samples whose electrostatic capacity passing rates were 90% or greater were marked as "GOOD", whereas samples whose electrostatic capacity passing rates were less than 90% were marked as "NOT GOOD".

Next, the reflow heat resistances of the electric double-layer capacitors of Samples No. 1 to 9 were measured through the method described hereinafter.

Figure 10:
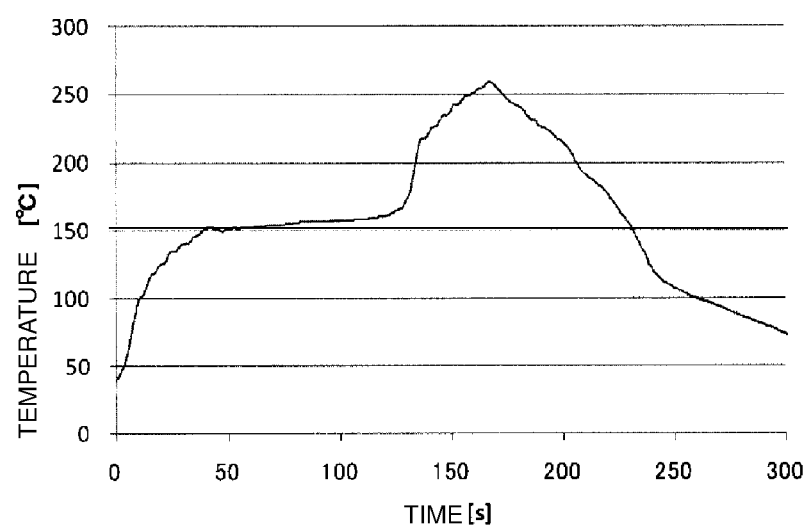
FIG. 10 is a graph illustrating a temperature profile during reflow, for evaluating reflow heat resistance in an electric double-layer capacitor according to a first example of the present invention.

First, after measuring initial electrostatic capacities of the electric double-layer capacitors of Samples No. 1 to 9 produced as described above, the samples were passed through a reflow oven (Nippon Antom Co., Ltd., HAS-5016) three times. FIG. 10 illustrates a reflow temperature profile. The peak temperature of the reflow oven was 260° C., and the time of a single pass through the reflow oven was set to 300 seconds. The electrostatic capacity of the electric double-layer capacitor was then remeasured to find a rate of change from the stated initial electrostatic capacity. Samples for which the rate of change was 20% or less were marked as "GOOD", samples for which the rate of change was greater than 20% but no greater than 50% were marked as "NOT SO GOOD", and samples for which the rate of change was greater than 50% were marked as "NOT GOOD".

Next, the breaking strength of the respective joining resin layers in Samples No. 1 to 9 were measured through the following method.

The breaking strength was measured at room temperature with a tension speed of 0.13 mm/s, using a dynamic viscoelasticity measurement device (TA Instruments, RSA-3), with both ends in the lengthwise direction of the samples for measuring the breaking strength in Samples No. 1 to 9 produced as described above kept at a chuck interval of 6 mm.

Next, the thermal decomposition starting temperatures of the joining layers in the electric double-layer capacitors of Samples No. 1 to 9 were measured through the method described hereinafter.

The thermal decomposition starting temperatures were measured by placing 20 mg of the samples for measuring the thermal decomposition starting temperature of Samples 1 to 9 produced as described above in an aluminum pan, which is an aluminum receptacle, and performing a thermogravimetric analysis at a rate of temperature increase of 5° C. per minute using a thermal analyzer (Shimadzu Corporation, DTG-60).

Table 1 shows the results of the aforementioned evaluations.

TABLE 1

| Sample No. | Electrostatic Capacity Passing Rate % | | Reflow Heat Resistance | Breaking Strength Mpa | Thermal Decomposition Starting Temperature ° C. |
|---|---|---|---|---|---|
| | | Mark | | | |
| 1 | 98 | GOOD | GOOD | 40 | 400 or Greater |
| 2 | 90 | GOOD | GOOD | 15 | 400 or Greater |
| 3 | 98 | GOOD | GOOD | 150 | 400 or Greater |
| 4 | 95 | GOOD | GOOD | 150 | 400 or Greater |
| 5* | 43 | NOT GOOD | GOOD | 5 or Less | 400 or Greater |
| 6* | 95 | GOOD | NOT GOOD | 30 | 220 |
| 7* | 0 | NOT GOOD | GOOD | 5 or Less | 400 or Greater |
| 8* | 32 | NOT GOOD | GOOD | 5 or Less | 330 |
| 9* | 24 | NOT GOOD | NOT GOOD | 5 or Less | 290 |

*outside of scope of present invention

A favorable electrostatic capacity passing rate was achieved by Samples No. 1 to 4 and 6.

After the electrochemical element layered blocks were removed from the samples whose electrostatic capacities passed and the samples whose electrostatic capacities did not pass, and were covered with resin, the LT (Length-Thickness) side surfaces were polished along the width directions of the electrochemical element layered blocks so as to obtain a polished cross-section at the ½ point in the width direction. Upon observing the layered collector electrodes from this polished cross-section, it was confirmed that at least one of the layered collector electrodes had broken in all of the samples whose electrostatic capacities did not pass. Such breakage in the collector electrodes was not observed in the samples whose electrostatic capacities passed.

Samples No. 5 and 7 to 9, whose electrostatic capacity passing rates were marked as "NOT GOOD", had a low joining resin layer breaking strength of 5 MPa or less. It is thus thought that the joining resin layers would be unable to withstand the stress placed thereon when removing the joining resin layers from the base films, during heated pressurization when layering the sheets, and so on, and would break easily as a result.

As a result, the collector films formed upon the joining resin layers may also have broken, leading to a drop in the electrostatic capacity.

Meanwhile, a favorable reflow heat resistance was achieved by Samples No. 1 to 5, 7, and 8.

Samples No. 6 and 9, for which the reflow heat resistance is marked "NOT GOOD", had a low thermal decomposition starting temperature of 290° C. or less in the joining layers. It is thus thought that the joining layers thermally decomposed under the reflow heat, causing the structure of the electric double-layer capacitor to break down due to gas produced and so on, causing products produced by the thermal decomposition to intermix with the electrolyte, and so on, which led to degradation in the electrical characteristics.

On the other hand, in Samples No. 1 to 4, in which the joining resin layers and joining layer contained a high-polymer having imide coupling in the main chain, the breaking strengths of the joining resin layers were high; it is thus thought that the joining resin layers and collector films were able to withstand the stresses placed thereon during the manufacturing process and a favorable electrostatic capacity passing rate was able to be achieved. Furthermore, because the thermal decomposition temperatures of the joining layers were high, it is thought that an electric double-layer capacitor having a high heat resistance was able to be obtained.

Second Example

In a second example, the electric double-layer capacitor was manufactured according to the manufacturing method described in the aforementioned embodiment. However, when joining the two positive-negative electrode integrated sheets 50A to each other, the temperature of the pressure plate was set to 130° C., the pressure used in the pressurization was set to 5 MPa, and the pressurizing time was set to 10 seconds.

Creation of Samples

Sample No. 10

Aside from the temperature of the pressure plate being set to 130° C., the pressure used in the pressurization being set to 5 MPa, and the pressurizing time being set to 10 seconds when joining the two positive-negative electrode integrated sheets 50A to each other, an electric double-layer capacitor of Sample No. 10 was obtained in the same manner as with Sample No. 1.

Sample No. 11

Aside from the temperature of the pressure plate being set to 130° C., the pressure used in the pressurization being set to 5 MPa, and the pressurizing time being set to 10 seconds when joining the two positive-negative electrode integrated sheets 50A to each other, an electric double-layer capacitor of Sample No. 11 was obtained in the same manner as with Sample No. 2.

Sample No. 12

Aside from the temperature of the pressure plate being set to 130° C., the pressure used in the pressurization being set to 5 MPa, and the pressurizing time being set to 10 seconds when joining the two positive-negative electrode integrated sheets 50A to each other, an electric double-layer capacitor was produced in the same manner as with Sample No. 3; however, the positive-negative electrode integrated sheets 50A could not be joined to each other, and thus the electric double-layer capacitor could not be obtained.

Sample No. 13

Aside from the temperature of the pressure plate being set to 130° C., the pressure used in the pressurization being set to 5 MPa, and the pressurizing time being set to 10 seconds when joining the two positive-negative electrode integrated sheets 50A to each other, an electric double-layer capacitor was produced in the same manner as with Sample No. 4; however, the positive-negative electrode integrated sheets 50A could not be joined to each other, and thus the electric double-layer capacitor could not be obtained.

Sample No. 14

Aside from the temperature of the pressure plate being set to 130° C., the pressure used in the pressurization being set to 5 MPa, and the pressurizing time being set to 10 seconds when joining the two positive-negative electrode integrated sheets 50A to each other, an electric double-layer capacitor of Sample No. 14 was obtained in the same manner as with Sample No. 5.

Sample No. 15

Aside from the temperature of the pressure plate being set to 130° C., the pressure used in the pressurization being set to 5 MPa, and the pressurizing time being set to 10 seconds when joining the two positive-negative electrode integrated sheets 50A to each other, an electric double-layer capacitor of Sample No. 15 was obtained in the same manner as with Sample No. 6.

Sample No. 16

Aside from the temperature of the pressure plate being set to 130° C., the pressure used in the pressurization being set to 5 MPa, and the pressurizing time being set to 10 seconds when joining the two positive-negative electrode integrated sheets 50A to each other, an electric double-layer capacitor was produced in the same manner as with Sample No. 7; however, the positive-negative electrode integrated sheets 50A could not be joined to each other, and thus the electric double-layer capacitor could not be obtained.

Sample No. 17

Aside from the temperature of the pressure plate being set to 130° C., the pressure used in the pressurization being set to 5 MPa, and the pressurizing time being set to 10 seconds when joining the two positive-negative electrode integrated sheets 50A to each other, an electric double-layer capacitor of Sample No. 17 was obtained in the same manner as with Sample No. 8.

Sample No. 18

Aside from the temperature of the pressure plate being set to 130° C., the pressure used in the pressurization being set to 5 MPa, and the pressurizing time being set to 10 seconds when joining the two positive-negative electrode integrated sheets 50A to each other, an electric double-layer capacitor was produced in the same manner as with Sample No. 9; however, the positive-negative electrode integrated sheets 50A could not be joined to each other, and thus the electric double-layer capacitor could not be obtained.

Note that in Samples No. 11 to 18, the solvent for the joining layer slurry and so on were selected as appropriate in accordance with the components of the joining layer.

Furthermore, in Samples No. 11, 14, and 15, in which the joining layer is a thermosetting resin, the heating temperature, heating time, and so on for thermally setting the resin were selected as appropriate in accordance with the components in the joining layer.

Evaluation of Samples

In Samples No. 10 and 11, in which the joining resin layers and joining layer contained a high-polymer having siloxane coupling in the main chain, the joining resin layers were joined to each other even when the temperature of the pressure plate was 130° C., and thus an electric double-layer capacitor was successfully obtained. Joining at low temperatures simplifies a heat-resistance design of the manufacturing facilities, which enables costs to be reduced. Furthermore, the base film can be suppressed from softening and deforming under heat, which in turn makes it possible to suppress a drop in the layering precision. Further still, the electrodes, the separator layers, and so on can be suppressed from being damaged by the heat.

REFERENCE SIGNS LIST 1 electrochemical element layered block
20A positive compound sheet
21a positive collector electrode
21b positive active material layer
21c positive collector layer
21t positive terminal electrode
30A negative compound sheet
31a negative collector electrode
31b negative active material layer
31c negative collector layer
31t negative terminal electrode
42 separator layer
50A positive-negative electrode integrated sheet
100 base film
101 mold releasing layer
102 positive collector film
R102 resist pattern
121 joining resin layer 122a, 132a conductive adhesive
122b positive package electrode
123 joining layer
132b negative package electrode
LB1 electrochemical element layered sheet
D1 cutting line

The invention claimed is:

1. An electric storage device comprising:
at least two first-polarity compound sheets, each of the at least two first-polarity compound sheets containing a first-polarity collector electrode, a first-polarity active material layer on a first surface of the first-polarity collector electrode, and a separator layer covering at least part of the first surface; and
at least one joining layer joining a second surface of the first-polarity collector electrode in a first of the at least two first-polarity compound sheets and a second surface of the first-polarity collector electrode in a second of the at least two first-polarity compound sheets, wherein
the at least one joining layer contains a polymer having imide coupling in a main chain thereof,
the at least two first-polarity compound sheets have a positive polarity, and the electric storage device further comprises:
at least two negative-polarity compound sheets, each of the at least two negative-polarity compound sheets containing a negative-polarity collector electrode, a negative-polarity active material layer on a first surface of the negative-polarity collector electrode, and a second separator layer covering at least part of the first surface; and
at least one second joining layer joining a second surface of the negative-polarity collector electrode in a first of the at least two negative-polarity compound sheets and a second surface of the negative-polarity collector electrode in a second of the at least two negative-polarity compound sheets, wherein
the at least one second joining layer contains a polymer having imide coupling in a main chain thereof, and
the separator layer of at least one of the at least two first-polarity compound sheets is joined to the second separator layer of one of at least two negative-polarity compound sheets to form a multilayer body.

2. The electric storage device according to claim 1, wherein the polymer has siloxane coupling in the main chain thereof.

3. The electric storage device according to claim 1, wherein the separator layer is selected from the group consisting of a thermoplastic resin and a thermoset resin.

4. The electric storage device according to claim 3, wherein the separator layer is polyvinylidene fluoride, a propylene hexafluoride copolymer, or polyethylene oxide.

5. The electric storage device according to claim 3, wherein the separator layer is polyimide, polyamide-imide or polyamide.

6. The electric storage device according to claim 1, further comprising a package that holds the multilayer body and an electrolyte within the package.

* * * * *